US012686737B2

(12) United States Patent
Ribeiro De Sousa Ferreira et al.

(10) Patent No.: US 12,686,737 B2
(45) Date of Patent: Jul. 21, 2026

(54) AQUEOUS COATING COMPOSITIONS BASED ON SELF-CROSSLINKING POLYURETHANE DISPERSIONS

(71) Applicant: SAINT-GOBAIN WEBER, Sucy-en-Brie (FR)

(72) Inventors: Pedro Miguel Ribeiro De Sousa Ferreira, São João de Ver (PT); Frank Hesselbarth, Recklinghausen (DE)

(73) Assignee: SAINT-GOBAIN WEBER FRANCE, Sucy-en-Brie (FR)

( * ) Notice: Subject to any disclaimer, the term of this patent is extended or adjusted under 35 U.S.C. 154(b) by 887 days.

(21) Appl. No.: 17/768,907

(22) PCT Filed: Oct. 13, 2020

(86) PCT No.: PCT/EP2020/078755
§ 371 (c)(1),
(2) Date: Apr. 14, 2022

(87) PCT Pub. No.: WO2021/074134
PCT Pub. Date: Apr. 22, 2021

(65) Prior Publication Data
US 2023/0081580 A1 Mar. 16, 2023

(30) Foreign Application Priority Data
Oct. 17, 2019 (EP) .................................... 19203908

(51) Int. Cl.
| | |
|---|---|
| *C08G 18/08* | (2006.01) |
| *C08G 18/12* | (2006.01) |
| *C08G 18/32* | (2006.01) |
| *C08G 18/34* | (2006.01) |
| *C08G 18/38* | (2006.01) |
| *C08G 18/48* | (2006.01) |
| *C08G 18/66* | (2006.01) |
| *C08K 3/22* | (2006.01) |
| *C09D 175/08* | (2006.01) |

(52) U.S. Cl.
CPC ..... *C08G 18/0866* (2013.01); *C08G 18/0823* (2013.01); *C08G 18/12* (2013.01); *C08G 18/3228* (2013.01); *C08G 18/348* (2013.01); *C08G 18/3893* (2013.01); *C08G 18/48* (2013.01); *C08G 18/667* (2013.01); *C08G 18/6692* (2013.01); *C08K 3/22* (2013.01); *C09D 175/08* (2013.01); *C08G 2150/00* (2013.01); *C08G 2170/00* (2013.01); *C08G 2190/00* (2013.01); *C08K 2003/2227* (2013.01); *C08K 2003/2296* (2013.01)

(58) Field of Classification Search
CPC .... C08G 18/08; C08G 18/0823; C08G 18/12; C08G 18/3228; C08G 18/348; C08G 18/3893; C08G 18/48; C08G 18/667;

C08G 18/6692; C08G 2150/00; C08G 2170/00; C08G 2190/00; C08K 3/22; C08K 2003/2227; C09D 175/08
USPC ......................................................... 524/591
See application file for complete search history.

(56) References Cited

U.S. PATENT DOCUMENTS

| | | | | |
|---|---|---|---|---|
| 5,316,791 A | * | 5/1994 | Farber | ..................... C08J 7/046 427/164 |
| 7,782,537 B2 | | 8/2010 | Naito et al. | |
| 2003/0055171 A1 | | 3/2003 | Overbeek et al. | |
| 2003/0065077 A1 | * | 4/2003 | Kimura | ............... C08K 5/5415 524/425 |
| 2013/0225755 A1 | * | 8/2013 | Snow | .................... B29C 41/003 264/234 |
| 2014/0044973 A1 | * | 2/2014 | Liu | ......................... B32B 15/20 977/773 |
| 2017/0174815 A1 | * | 6/2017 | Lu | ...................... C08G 18/4244 |

FOREIGN PATENT DOCUMENTS

| | | |
|---|---|---|
| EP | 0332326 A2 | 9/1989 |
| EP | 3527694 A1 | 8/2019 |
| JP | 2018027652 A | 2/2018 |
| JP | 2019150994 A | 9/2019 |
| WO | WO-2006099918 A2 | 9/2006 |
| WO | WO-2018136488 A1 | 7/2018 |

OTHER PUBLICATIONS

CN104758196A Claims_ original and translation (Yang et al., Aqueous Nail Polish Based On Aqueous Polyurethane Dispersion, Year: 2015) (Year: 2015).*
CN104758196A Description_ original and translation (Yang et al., Aqueous Nail Polish Based On Aqueous Polyurethane Dispersion, Year: 2015) (Year: 2015).*
PhytoTech (Phyto Tech Labs, Safety Data Sheet) (Year: 2022).*
International Search Report issued Jan. 12, 2021 in PCT/EP2020/078755, 2 pages.
Written Opinion issued Jan. 12, 2021 in PCT/EP2020/078755, 6 pages.
Office Action issued Mar. 17, 2026, in corresponding European Patent Application No. 20790288.3, 54 pages.

* cited by examiner

*Primary Examiner* — Arrie L Reuther
*Assistant Examiner* — Doris Ling
(74) *Attorney, Agent, or Firm* — Element IP, PLC

(57) ABSTRACT

The present invention is drawn to an aqueous polyurethane dispersion comprising: —anionic polyurethane particles comprising both free pending carboxylate groups of formula —COO⁻M⁺ where M⁺ is a cation resulting from neutralization of carboxylic acid groups with a base, and pending carboxylate ester groups resulting from esterification of free carboxylic acid groups with an epoxysilane, —crosslinking particles made of water-insoluble transition metal compounds. It is also drawn to a method of coating a substrate comprising applying such an aqueous polyurethane dispersion onto a substrate and letting it dry, preferably without applying any heat or radiation.

19 Claims, No Drawings

AQUEOUS COATING COMPOSITIONS BASED ON SELF-CROSSLINKING POLYURETHANE DISPERSIONS

The present invention is drawn to aqueous self-crosslinking compositions based on film-forming polyurethane dispersions functionalized with anionic carboxylate groups partially esterified with epoxysilanes and further comprising transition metal compound particles as a crosslinking agent.

Solvent-based polyurethane coatings have been used for several years in the technical field of waterproofing construction materials, for example in roofing and balcony systems. These solvent-based water-proofing compositions are well known for their durability and ease of application. They provide certified durabilities of 25 years (ETAG 005, Guidelines for European Technical Approval of Liquid Applied Roof Waterproofing Kits).

The solvent-based compositions however represent a risk to the health of the applicators due to the flammability of the solvent and presence of free isocyanate monomers which, when present at concentrations >0.1%, are considered as being harmful in contact with the skin and in case of inhalation.

For the above reasons, solvent-based polyurethane coatings are presently restricted mainly to professional use.

There is a general trend, in all kinds of technical fields, to convert solvent-based systems to waterborne systems.

Film-forming aqueous polyurethane dispersions (PUD) have thus been proposed several years ago. They are free of isocyanate monomers and of residual isocyanate groups on the polymer.

Their use in the field of gluing or coating, especially of waterproofing, of substrates that are meant to be used in humid environments however is not satisfactory because they have very long drying times, late rain resistance and suffer from high water uptake and subsequent degradation of their mechanical performances even several weeks after application, film-formation and water evaporation. The low water resistance has been attributed to the high charge density of the PUDs (stabilizing charges of the surfactant or of the polymer chain) and to the fact that film-forming is due only to coalescence of the polymer particles but is not accompanied by chemical crosslinking.

In order to overcome the low water resistance of PU films, cross-linkable silyl-terminated PUD have been proposed (see for example U.S. Pat. Nos. 6,046,295, 5,919,860 and US 2017/0174815). In these documents the isocyanate terminated prepolymers are reacted with a silane compound comprising two or three alcoxysilyl groups and an isocyanate-reactive group such as —NH, OH or SH. Such silyl-terminated PUD however still do not always allow to prepare fast drying and sufficiently water resistant coatings or adhesives. As a matter of fact, as the crosslinking silyl groups are present only at the end of the polymer chains, their density cannot be increased at will.

The present invention is based on the idea of introducing crosslinking silyl groups not as end groups but as pendant groups all along the polyurethane chain, thereby freely adjusting the number of silyl groups, i.e. the number of crosslinking groups.

The inventors thus have functionalized anionic polyurethanes by reacting part of the pendant carboxylate groups with epoxysilanes. The epoxy group of the silane esterifies with the carboxylate groups of the anionic polyurethanes, thereby decreasing the overall anionic charge density of the dispersed polymer particles and covalently bonding alcoxysilyl groups to the polymer. The decrease of the anionic charges on the PU particles could be easily followed by monitoring the decrease of the negative zeta potential during reaction time.

During their experimental research the inventors have observed that it was difficult, and also not desirable, to esterify more than about half of the PUD carboxylate groups. The remaining non-reacted carboxylate groups provide stability to the silyl-functionalized PU dispersion. However, if too many anionic charges are left on the PUD after esterification, their hydrophilic nature does not allow to sufficiently decrease the water uptake and increase the durability and mechanical performances of the resulting dried coating.

The inventors surprisingly found that it was however possible to take advantage of these remaining anionic charges by using specific crosslinking particles as an additional crosslinking agent, and thereby further increase the durability of the final coating without destabilizing the polyurethane dispersion before application to the substrate.

A first subject matter of the present application is an aqueous polyurethane dispersion comprising:

anionic polyurethane particles comprising both free pending carboxylate groups of formula —COO$^-$M$^+$ where M$^+$ is a cation resulting from neutralization of carboxylic acid groups with a base, and pending carboxylate ester groups resulting from esterification of free carboxylic acid groups with an epoxysilane, crosslinking particles made of water-insoluble transition metal compounds.

In a second aspect, the present invention is drawn to a method of preparing such an aqueous polyurethane dispersion, said method comprising esterifying pendant carboxylate groups of an anionic polyurethane dispersion by reacting them with an epoxysilane, dispersing water-insoluble transition metal compound particles in the anionic polyurethane dispersion.

The polyurethane dispersions used in the present invention are well known in the prior art and their preparation is described for example in U.S. Pat. No. 7,345,110.

An isocyanate terminated prepolymer is first prepared by reaction of polyols with a stoichiometric excess of polyisocyanates, the NCO/OH ratio being generally comprised between 1.2 and 5.

The polyisocyanates may be aliphatic polyisocyantes such as for example 1,6-hexamethylene-diisocyanate, isophorone-diisocyanate, 2,4 hexahydrotoluene-diisocyanate, 2,6 hexahydrotoluene diisocyanate, dicyclohexylmethane-diisocyanates, tétraméthylxylène-diisocyanate, norbornane-diisocyanate, bis-isocyanatomethyl)cyclohexane, tetramethylène-1,4-diisocyanate, cyclohexane-1,4-diisocyanate, 1,12-dodecane-diisocyanate, and 2,2,4-trimethylhexamethylene-diisocyanate.

Aromatic polyisocyanates may also be used. They are selected for example from the group consisting of xylylene-diisocyanate, 2,4-toluene-diisocyanate, 2,6-toluene-diisocyanate, and methylene-diphenyl-diisocyanate.

The polyols are for example polyether-polyols, polyester-polyols or polycarbonate-polyols, or mixtures thereof.

To introduce anionic charges into the polymer, a dihydroxylated carboxylic acid such as dimethylol propionic acid (DMPA) is copolymerized together with the polyols and polyisocyanates.

The resulting isocyanate prepolymer carrying pendant carboxylic acid groups is then dispersed under shear in water, an amine-type base being added to neutralize the carboxylic acid groups.

The third step of the preparation of the anionic PUD is chain extension by addition of polyamines, generally diamines, which react with the isocyanate groups to form urea links. An isocyanate-free poly(urea/urethane) with pendant neutralized carboxylate is thus obtained.

A preferred PUD is prepared from aromatic diisocyanates and polyether-polyols.

As explained above, the anionic carboxylate groups are partially esterified by reaction with epoxysilanes, the remaining non-esterified carboxylate groups being available for stabilizing the PUD and for crosslinking with transition metal compound particles upon drying of the coating.

The inventors have found that the PUD, before being reacted with epoxysilane, preferably should not have an excessively high amount of anionic carboxylate groups. Their acid value (mass of KOH in milligrams that is required to neutralize one gram of chemical substance) is preferably comprised between 5 and 25, more preferably between 10 and 18, and still more preferably between 12 and 17.

PUDs having acid values higher than the upper limits of the above ranges require excessively high amounts of epoxysilanes and/or crosslinking particles. Adding too much epoxysilanes during the esterification step of the pendant carboxylate groups would result in early gelification/coagulation of the dispersion and would not allow preparation of a stable, self-crosslinking PU dispersion. On the other hand, adding very high levels of crosslinking particles implies the use of high amounts of dispersing agents (surfactants) which would make the resulting dried coating more hydrophilic and less water resistant.

Controlling the overall initial anionic charge of the non-esterified PUD, selecting two different types of crosslinking agents (epoxysilane & crosslinking particles) and using each of them in moderate amounts has allowed the inventors to prepare water-based, non-toxic, self-crosslinking polyurethane dispersions which have a shelf life of at least several months and which, after drying and crosslinking, result in polyurethane coatings having water resistance and mechanical performances equivalent to those obtained from solvent-based polyisocyanate/polyols systems.

Any water-soluble epoxysilane may be used for partially esterifying the anionic carboxylate groups of the PUD. Monomeric epoxysilanes comprise a single epoxy group, also called glycidyl, and two or three hydrolysable alkoxy groups attached to the silicon. Preferred monomeric epoxysilanes are selected from the group consisting of 3-glycidyloxypropyl-trialkoxysilanes, 3-glycidyloxypropyl-dialkoxyalkylsilanes, epoxycyclohexylethyletrialkoxysilanes, epoxycyclohexyl-ethyldialkoxyalkylsilanes. The alkoxy groups are preferably ethoxy groups.

The inventors have also used water-soluble epoxysilane oligomers comprising a short siloxane chain with pendant epoxy groups. The preparation of such oligomers is described for example in EP1896522 and they are available under the reference CoatOSil MP 200 from Momentive.

The epoxysilane is added to the PUD in an amount comprised between 0.3 and 5.0% by weight, preferably between 0.4 and 4.0% by weight and more preferably between 0.5 and 3.0% by weight with respect to the dry weight of the PUD. When the amount of epoxysilane added to the PUD is higher than about 4.0-5.0% by weight, the reaction mixture jellifies during the reaction time and is no longer suitable as a coating composition. For amounts below about 0.3-0.4% by weight, the remaining anionic charge density on the PUD is too high and requires the addition of excessive amounts of crosslinking particles. The amounts of crosslinking particles however cannot be increased at will because there is a risk of sedimentation or a need of excessively high amounts of dispersing agent.

For reacting the PUD with the epoxysilane, the epoxysilane is added slowly, preferably drop-by-drop, to the PUD at room temperature and under agitation and the mixture is left to react for at least several hours. It is not necessary to keep the reaction mixture under agitation, nor is it necessary to heat the reaction mixture. The reaction time at room temperature (20° C.) is generally comprised between 10 hours and 100 hours, more preferably between 20 and 80 hours, more preferably between 40 and 75 hours.

The crosslinking particles are incorporated into the polyurethane dispersion preferably after part of the anionic carboxylate groups have been esterified with the epoxysilane.

The transition metal compounds forming the crosslinking particles used in the present invention must be insoluble in the aqueous phase of the PUD, water-insoluble transition metal compounds being defined in the present application as compounds having a solubility in distilled water at 20° C. of less than 0.001%. As a matter of fact, the PUD composition must not comprise significant amounts of free multivalent transition metal cations which would immediately result in early crosslinking of the carboxylated polymer, and then cause the dispersion to jellify, precipitate or sediment. The PUD compositions of the present invention consequently are essentially devoid of free multivalent transition metal ions, i.e. they comprise less than 0.1 wt %, preferably less than 0.01 wt % of water-soluble transition metal salts such as for example zirconium potassium carbonates or zirconium ammonium carbonates described for example in U.S. Pat. No. 4,061,720.

The transition metal compounds are preferably selected from transition metal salts, transition metal oxides and transition metal hydroxides. Transition metal oxides are particularly preferred. The transition metal is advantageously selected from the group consisting of zinc, aluminum, tin, tungsten and zirconium, preferably consisting of zinc, aluminum, tin, and tungsten, zinc and aluminum being particularly preferred. The inventors have obtained excellent results with zinc oxide particles.

Crosslinking of carboxylated polymers by transition metal compound particles is known and described for example in U.S. Pat. No. 8,236,903 and US 2008/0255273. These prior art documents describe in particular nanoparticles, i.e. particles having submicron dimensions, which when thoroughly incorporated into the polymer matrix provide a large surface of contact for efficient crosslinking. The inventors were surprised when they found that non nanoscale particles could also be used to efficiently contribute to the crosslinking of carboxylated polyurethane dispersions. These particles, having an average particles size higher than about 1 micron are far less expensive and less problematic from an environmental point of view than the nanoparticles described in the literature.

For the above reasons, the water-insoluble crosslinking particles made of transition metal compounds used in the present invention preferably have a weight average particle diameter measured by laser diffraction comprised between 1.0 µm and 20 µm, preferably between 1.5 and 10 µm.

The amount of crosslinking particles used in the present invention is such that the weight ratio of crosslinking particles to anionic polyurethane particles preferably is comprised between 0.01 and 0.40, more preferably between 0.2 and 0.25 and in particular between 0.03 and 0.15.

It is necessary to efficiently disperse the crosslinking particles and to stabilize the dispersion so that the particles will not sediment during storage. This can be done by incorporating a sufficient amount of a dispersant and/or of a thickening agent into the aqueous PUD together with the crosslinking particles.

The dispersing agent may be for example a surfactant, preferably a non-ionic surfactant, and the thickening agent generally is a water soluble organic polymer such as cellulose derivatives, salts of poly(acrylic acid) and copolymers thereof, xanthan, and poly(vinyl alcohol), nonionic polyurethane associative thickeners These adjuvants, which are helpful for dispersing and stabilizing the transition metal compound particles, should be used in rather low amounts. Their hydrophilic nature indeed could impair the durability of the dried coating or adhesive by promoting water absorbance.

The total amount of dispersant and/or thickening agent should not be higher than about 10% by weight with respect to the dry weight of the PUD. It preferably is comprised between 1% and 10%, more preferably between 2 and 9%, and particularly between 3% and 8% by weight with respect of the dry weight of the PUD.

The polyurethane dispersion of the present invention further may comprise one or more mineral fillers in a total amount of from 0.1 to 70 weight %, preferably from 1.0 to 40 weight %, more preferably from 5 to 30 weight % with respect to the total dry weight of the dispersion.

The fillers are of course different from the transition metal compounds of the crosslinking particles. They may be selected for example from calcium carbonate, barium sulfate, clay, talcum, dolomite, mica, silica sand, crushed basalt, kaolin, in particular calcinated kaolin.

It is also possible to mix the PUD comprising the anionic polyurethane with partially esterified carboxylate groups and the crosslinking particles with any other kind of polymer latexes. Such latexes may be selected for example from the group consisting of poly(vinyl acetate/ethylene) latex, poly (acrylic ester) latex, poly(styrene/acrylic ester) latex, poly (vinyl acetate) latex, poly(styrene/butadiene) latex, poly (acrylic ester/vinyl acetate) latex, poly(vinyl acetate/vinyl versatate) latex, poly(vinyl propionate/acrylic ester) latex, natural rubber latex, prevulcanized naturel rubber latex, poly(styrene-butadiene/styrene) latex or poly(vinyl acetate/ethylene/vinyl chloride) latex, or mixtures thereof. The latexes mixed with the PUD preferably also comprise anionic groups that may be crosslinked with the crosslinking particles used in the present invention.

It is also possible to combine the PUD of the present invention with aqueous dispersions of bitumen of any kind.

When mixing the above latexes or bitumen dispersion with the above-described PUD the respective amounts of PUD and latexes/bitumen dispersions should be such that the resulting dry coating or dry adhesive have acceptable durabilities and water resistance.

In a preferred embodiment of the resulting PUD/latex mixture or the resulting PUD/bitumen mixture the dry weight of the carboxylated and esterified polyurethane polymer should be higher than the latex or the bitumen.

The amount of water of the polyurethane dispersions of the present invention is comprised between 30% and 95%, preferably between 35 and 75% with respect to the total weight of the dispersion. When the PUD are mixed with other latexes or bitumen dispersions, this water content should be understood as the water content of the mixture of these dispersions.

The aqueous polyurethane dispersions of the present invention are self-crosslinking compositions, also called one-component compositions, i.e. they do not require the introduction of a catalyst or any additional crosslinking agent immediately before applying the dispersion to the substrate to be coated, treated, glued or bonded. This makes their use as coating compositions, primers, adhesives, bonding agents, sealants etc. very simple and convenient. The PUD of the present invention can be applied to a substrate or between two substrates and will dry without the need of applying energy in the form of heat or radiation. In case the PUD is applied between two substrates, at least one of them should be sufficiently porous or water permeable to allow the water of the PUD to evaporate.

Another subject matter of the present invention is consequently a method of coating, in particular water-proofing, a substrate comprising applying an aqueous polyurethane dispersion as described above onto a substrate or between substrates and letting it dry, preferably without applying any heat or radiation.

The self-crosslinking polyurethane dispersions of the present invention may also be used in combination with a second crosslinking component, such as for example a polyisocyanates component. Such a component should easily mix with the aqueous dispersion of the invention. Water-dispersible polyisocyanates that may be used in combination with the PUD of the present invention are available for example under the Bayhydur® from Covestro. When dispersed in the aqueous PUD of the present invention these compounds are self-crosslinking and may strengthen the resulting polymer coating.

The aqueous self-crosslinking polyurethane dispersions of the present invention are useful in a variety of technical fields where water-resistant and temperature resistant coatings on substrates or between substrates need to be formed.

The PUD may for example be used as a coating composition, in particular water-proofing composition of substrates, for example for exterior construction substrates such as roofs, facades or balconies, as a coating composition of wood, floorings, stone, concretes, renders, plasters, metal or polymer substrates, as an adhesive, as a sealant, as primers.

The PUD may also be used for coating substrates in order to improve durability, mechanical and/or chemical resistance thereof.

They are also useful as undercoats in waterproofing substrates beneath tiles, or as coatings of building components such as roofs, industrial or decorative floors, basements, balconies, terraces, bridge elements.

EXAMPLES

Four aqueous polyurethane dispersions having the compositions listed in Table 1 below were prepared as follows:

Example 1: An Aqueous Dispersion of an Anionic Polyurethane prepared from a polyether-polyol, aromatic diisocyanate, dimethylol propionic acid and ethylene-diamine as a chain extender was prepared. The resulting polyurethane dispersion (PUD) had a dry matter content of 42%, and an acid value of 16.1 mg KOH/g. 0.5% by weight 3-glycidyloxypropyl-triethoxysilane, with respect to the dry weight of PUD, was added drop-by-drop over a period of one hour to the PUD. The container was closed and the mixture was left to react for 72 hours without agitation. After 72-hour reaction, the dispersant and defoamer were added under agitation. After 5 minutes of agitation, the ZnO and fillers (barium sulfate, calcium carbonate) were added at once and dispersed by high speed mixing during 30 minutes. At the end, the viscosity was adjusted with a mixture of the remaining water, propyleneglycol and thickener (nonionic polyurethane associative thickeners).

The granulometric parameters of the ZnO particles are as follows: $D_{90}$: 9.83 µm; $D_{50}$: 3.35 µm, $D_{10}$: 0.72 µm and $D_{mean}$: 4.64 µm.

Comparative Example 2 was prepared as Example 1 except that the PUD was not reacted with 3-glycidyloxy-propyl-triethoxysilane and no ZnO particles were incorporated into the dispersion.

Comparative Example 3 was prepared as Example 1 with the only difference that the PUD was not reacted with 3-glycidyloxypropyl-triethoxysilane.

Comparative Example was prepared as Example 1 with the only difference that no ZnO particles were incorporated into the composition.

TABLE 1

|  | Example 1 (invention) | Comparative Example 2 | Comparative Example 3 | Comparative Example 4 |
|---|---|---|---|---|
| PUD |  | 60 | 60 |  |
| Epoxysilane-PUD | 60 |  |  | 60 |
| ZnO | 3 |  | 3 |  |
| Dispersant | 0.1 | 0.1 | 0.1 | 0.1 |
| Defoamer | 0.5 | 0.5 | 0.5 | 0.5 |
| Barium sulfate | 10 | 10 | 10 | 10 |
| Calcium carbonate | 15 | 18 | 15 | 18 |
| Talcum | 5 | 5 | 5 | 5 |
| Monopropyl-eneglycol | 1 | 1 | 1 | 1 |
| Thickener | 2 | 2 | 2 | 2 |
| Water | 3.4 | 3.4 | 3.4 | 3.4 |

The polyurethane dispersions were then coated onto a polyethylene film in a wet thickness of 1 mm and were let to dry/cure for 7 or 28 days at room temperature. The coatings were then peeled off the polyethylene substrate and the membranes were cut into samples. The membranes dried for 7 days were then weighed, immersed in distilled water at room temperature for 24 hours or 14 days, weighed again and the weight increase (water uptake) was calculated and expressed with respect to the initial dry weight of the sample. The mechanical properties, i.e. elongation at break (EaB) and tensile strength (TS), before and after water immersion were measured according to ASTM D412.

The results are depicted in Table 2

TABLE 2

|  | Example 1 | Comparative Example 2 | Comparative Example 3 | Comparative Example 4 |
|---|---|---|---|---|
| EaB after 7 days of curing | 372% | 340% | 350% | 360% |
| EaB after 28 days of curing | 305% | 285% | 320% | 335% |
| TS after 7 days of curing | 5.40 MPa | 3.20 MPa | 3.70 MPa | 3.90 MPa |
| TS after 28 days of curing | 5.45 MPa | 3.95 MPa | 4.10 MPa | 4.30 MPa |
| Water uptake after 24 h immersion | 0.5% | 7.61% | 7.25% | 6.43% |
| Water uptake after 14 days immersion | 2.0% | 18.0% | 12.0% | 9.0% |
| EaB after 48 h immersion | 410% | 810% | 620% | 600% |
| TS after 48 h immersion | 4.91 MPa | 2.70 MPa | 3.40 MPa | 4.05 MPa |
| EaB after 14 days of immersion | 546% | 950% | 750% | 710% |

TABLE 2-continued

|  | Example 1 | Comparative Example 2 | Comparative Example 3 | Comparative Example 4 |
|---|---|---|---|---|
| TS after 14 days of immersion | 4.52 MPa | 2.40 Mpa | 3.20 Mpa | 3.90 MPa |

It can be seen that the polyurethane membrane of Example 1 cures much faster than those of the Comparative Examples 2-4. Its tensile strength hardly increases after only 7 days of curing.

The membrane of Example 1 further takes up much less water. Its water uptake after 24 h of immersion is nearly identical to the water uptake of a one-component solvent-based polyurethane resin (Mariseal® 250 from Maris Polymers) tested under same conditions.

Most importantly the mechanical performances of the polyurethane membrane of the invention (Example 1) deteriorate far less during immersion than those of the membranes of Comparative Examples 2-4.

These experimental examples thus show that the combined use of an epoxysilane and of crosslinking particles of transition metal compound particles results in a non-toxic, solvent free, non-flammable, stable film-forming polyurethane dispersion which, when coated onto a substrate, forms water-resistant coatings that display good maintenance of their mechanical performances.

The invention claimed is:

1. An aqueous self-crosslinking polyurethane dispersion, comprising;
   anionic polyurethane particles comprising both free pendant carboxylate groups of formula —$COO^-M^+$, wherein $M^+$ is a cation resulting from neutralization of carboxylic acid groups with a base, and pendant carboxylate ester groups resulting from esterification of free carboxylic acid groups with an epoxysilane; and
   crosslinking particles comprising a water-insoluble transition metal compound, wherein the transition metal of the water-insoluble transition metal compound is selected from zinc, aluminum, tin, and tungsten.

2. The aqueous polyurethane dispersion according to claim 1, wherein the water-insoluble transition metal compound is selected from transition metal salts, transition metal oxides, and transition metal hydroxides.

3. The aqueous polyurethane dispersion according to claim 1, wherein a weight ratio of the crosslinking particles to the anionic polyurethane particles is 0.01 to 0.40.

4. The aqueous polyurethane dispersion according to claim 3, wherein the weight ratio of the crosslinking particles to the anionic polyurethane particles is 0.2 to 0.25.

5. The aqueous polyurethane dispersion according to claim 3, wherein the weight ratio of the crosslinking particles to the anionic polyurethane particles is 0.03 to 0.15.

6. The aqueous polyurethane dispersion according to claim 1, wherein the crosslinking particles have a weight average particle diameter, measured by laser diffraction, of 1.0 µm to 20 µm.

7. The aqueous polyurethane dispersion according to claim 6, wherein the weight average particle diameter of the crosslinking particles is 1.5 to 10 µm.

8. The aqueous polyurethane dispersion according to claim 1, wherein the epoxysilane is selected from the group consisting of 3-glycidyloxypropyl-trialkoxysilanes, 3-glycidyloxypropyl-dialkoxyalkylsilanes, epoxycyclohexylethyltrialkoxy-silanes, epoxycyclohexyl-ethyldialkoxyalkylsi-lanes, and water-soluble epoxysilane oligomers.

9. The aqueous polyurethane dispersion according to claim 1, further comprising from 0.1 to 70 weight % of mineral fillers.

10. The aqueous polyurethane dispersion according to claim 9, comprising from 1.0 to 40 weight % of the mineral fillers.

11. The aqueous polyurethane dispersion according to claim 1, further comprising a dispersing agent and/or a thickening agent.

12. The aqueous polyurethane dispersion according to claim 11, wherein the dispersing agent is a non-ionic sur-factant and the thickening agent is a water-soluble organic polymer.

13. The aqueous polyurethane dispersion according to claim 1, wherein the amount of water is 30% to 95%.

14. A method of preparing the aqueous polyurethane dispersion according to claim 1, the method comprising:

esterifying pendant carboxylate groups of an anionic polyurethane dispersion by reacting them with an epox-ysilane; and dispersing water-insoluble transition metal compound particles in the anionic polyurethane dispersion.

15. The method according to claim 14, wherein the amount of epoxysilane used for esterification is 0.3 to 5.0% by weight with respect to the dry weight of the polyurethane dispersion.

16. A method of coating a substrate, the method compris-ing:

applying the aqueous polyurethane dispersion according to claim 1 on a substrate and letting it dry.

17. A water-proofing composition, a coating composition, an adhesive, or a sealant, comprising:

the aqueous polyurethane dispersion according to claim 1.

18. The aqueous polyurethane dispersion according to claim 1, wherein the water-insoluble transition metal com-pound is a transition metal oxide.

19. The aqueous polyurethane dispersion according to claim 1, wherein the transition metal of the water-insoluble transition metal compound is selected from zinc and alumi-num.

* * * * *